(12) United States Patent
Gill et al.

(10) Patent No.: US 6,247,619 B1
(45) Date of Patent: Jun. 19, 2001

(54) FLEXIBLE CONTAINER FOR STORING AND DISPENSING LIQUIDS

(75) Inventors: Yoram Gill, Tirat Carmel; Asaf Ezer, Misgav, both of (IL)

(73) Assignee: Source Vagabond Systems, Inc., Tirat Carmel (IL)

( * ) Notice: Subject to any disclaimer, the term of this patent is extended or adjusted under 35 U.S.C. 154(b) by 0 days.

(21) Appl. No.: 09/297,384

(22) PCT Filed: Aug. 3, 1997

(86) PCT No.: PCT/IL97/00263

§ 371 Date: Jul. 27, 1999

§ 102(e) Date: Jul. 27, 1999

(87) PCT Pub. No.: WO98/05560

PCT Pub. Date: Feb. 12, 1998

(30) Foreign Application Priority Data

Aug. 4, 1996 (IL) ........................................................ 119005

(51) Int. Cl.[7] .................................................. B65D 35/56
(52) U.S. Cl. ........................ 222/105; 222/175; 222/386.5; 222/529
(58) Field of Search .................................... 222/105, 175, 222/212, 386.5, 396, 397, 529

(56) References Cited

U.S. PATENT DOCUMENTS

| 2,013,358 | * | 9/1935 | Osborne | 222/175 |
|---|---|---|---|---|
| 3,731,854 | * | 5/1973 | Casey | 222/386.5 |
| 4,156,022 | | 5/1979 | Nugent | 426/108 |
| 4,526,298 | | 7/1985 | Boxer et al. | 222/130 |
| 4,623,075 | | 11/1986 | Riley | 222/95 |
| 4,955,512 | | 9/1990 | Sharples | 222/386.5 |
| 4,964,540 | * | 10/1990 | Katz | 222/386.5 |
| 4,984,713 | | 1/1991 | Chambers et al. | 222/105 |
| 5,060,833 | * | 10/1991 | Edison et al. | 222/175 |
| 5,062,591 | * | 11/1991 | Runkel | 222/175 |
| 5,085,349 | | 2/1992 | Fawcett | 222/175 |
| 5,645,404 | * | 7/1997 | Zelenak | 222/175 |

FOREIGN PATENT DOCUMENTS

2249775 * 5/1992 (GB) ...................................... 222/175

* cited by examiner

Primary Examiner—Joseph A. Kaufman
(74) Attorney, Agent, or Firm—Morgan & Finnegan LLP

(57) ABSTRACT

A flexible container for storing and dispensing liquids including an inner bag and at least one outer bag, and liquid dispensing means, wherein the inner bag is a collapsible impervious bag for dispensing liquid located within the outer bag, wherein the outer bag's longitudinal dimensions are smaller than the inner bag's dimensions such that at any given imaginary cross section, the inner bag's circumference at the imaginary cross section is greater than the outer bag's circumference at the same imaginary cross section, and wherein the outer bag is made of a substantially non-stretching flexible material, thus imparting the outer bag's high pressure and external impact durability properties to the inner bag.

14 Claims, 6 Drawing Sheets

FLEXIBLE CONTAINER FOR STORING AND DISPENSING LIQUIDS

FIELD OF THE INVENTION

The present invention relates to liquid containers. More particularly it relates to a flexible container for storing and dispensing liquids.

BACKGROUND OF THE INVENTION

The human need to migrate in the early days of history brought about the need to find solutions for water and liquid transportation that was to be both convenient and safe. The solution was to carry water in bags made of animal hide, known as waterskins, on journeys, as it was inconvenient to carry around clay jugs or other rigid vessels.

In the beginning of the 20th century however it was more customary to use rigid metal vessels for the transport of liquids, such as the tin water flask, gasoline jerricans, buckets and barrels.

As plastic products started to appear, around the middle of this century, it took over from metal and became widely in use in the manufacturing of rigid liquid vessels.

Furthermore as plastic production techniques evolved improved flexible liquid vessels were introduced. Examples are infusion or blood bags used in hospitals, milk bags and ketchup or mustard bags used in fast food restaurants.

Major advantages of the flexible liquid containers over the rigid ones are their relatively easy storage, as they take up almost only as much space as needed for their contents, and take very little space when empty. Another advantage of flexible containers over rigid ones is the convenience in transporting and in carrying them around. They conform to the shape of the body or vehicle which carries them. They integrate very well with other equipment carried in activities such as military and outdoor activities. Yet another advantage is the fact that rigid containers, when not filled to their maximum capacity with liquid, have excess air locked inside, which can cause oxidation of the stored liquid, whereas in flexible containers the volume of the container can be determined by the volume of the liquid inside, and therefore no (or little) air remains locked inside. Another advantage is that flexible containers are easily produced in various shapes and sizes, and their production cost is relatively low—this is true both for the production materials and the production tools. These advantages are especially valuable for military purposes or recreational purposes like jogging, cycling, mountaineering, camping etc.

In U.S. Pat. No. 4,526,298 (Boxer et al.) a sport hydration system was introduced, including a flexible liquid container or bag, suspended from the shoulder.

In U.S. Pat. No. 5,085,349 (Fawcett) a resilient valve and dispensing system for bicyclists was disclosed. The valve was designed of an elastic material and had a cut at its top edge. In order to drink the user was to bite the valve thus forcing the cut on the valve open, and allowing for the liquid to flow through.

However flexible liquid containers have a disadvantage being vulnerable and easy to pierce or burst. This has led to solutions which seek to provide external means of defense to flexible bags.

In U.S. Pat. No. 4,623,075 (Riley) a Bag-in Box type of container for pressurized liquid was disclosed, consisting of a flexible bag located inside a tube of rigid or inelastic material or a sleeve of elastic material.

In U.S. Pat. No. 4,955,512 (Sharples) a liquid container and dispenser for controlled liquid dispensation was disclosed, having a rigid or semi-rigid housing and an inner flexible bag.

In U.S. Pat. No. 4,984,713 (Chambers et al.) a carbonated beverage dispenser was disclosed, comprising a collapsible fluid holding container, disposed within an outer rigid container.

The above solutions failed to provide a flexible liquid container that is both flexible (i.e. its external walls are flexible too) and can withstand high pressures.

It is an object of the present invention is to provide a flexible liquid container which is capable of withstanding high pressures, resulting from a sudden outside impact or from a pressurized liquid stored inside.

Another object of the present invention is to provide such a flexible liquid container that would be suitable for convenient transporting and for safe use in various outdoor activities.

It is yet another object of the present invention to provide a flexible liquid container based on an impermeable inexpensive replaceable odorless and tasteless inner bag, inside a durable outer bag.

It is another object of the present invention to provide a "Bag-in-Bag" flexible liquid container, where the outer bag imparts high pressure and external impact durability properties to the inner bag which in itself does not possess these properties.

BRIEF DESCRIPTION OF THE INVENTION

The flexible container for storing and dispensing liquids of the present invention comprises an inner bag and at least one outer bag, and liquid dispensing means, wherein said inner bag is a collapsible impervious bag for dispensing liquid, located within said outer bag, wherein the outer bag's longitudinal dimensions are smaller than the inner bag's, such that at any given imaginary cross section, the inner bag's circumference at said imaginary cross section is greater than the outer bag's circumference at the same imaginary cross section, and wherein the outer bag is made of a substantially non-stretching flexible material, thus imparting the outer bag's high pressure and external impact durability properties to the inner bag which in itself does not necessarily possess these properties.

DETAILED DESCRIPTION OF THE FIGURES

Figure 1A:
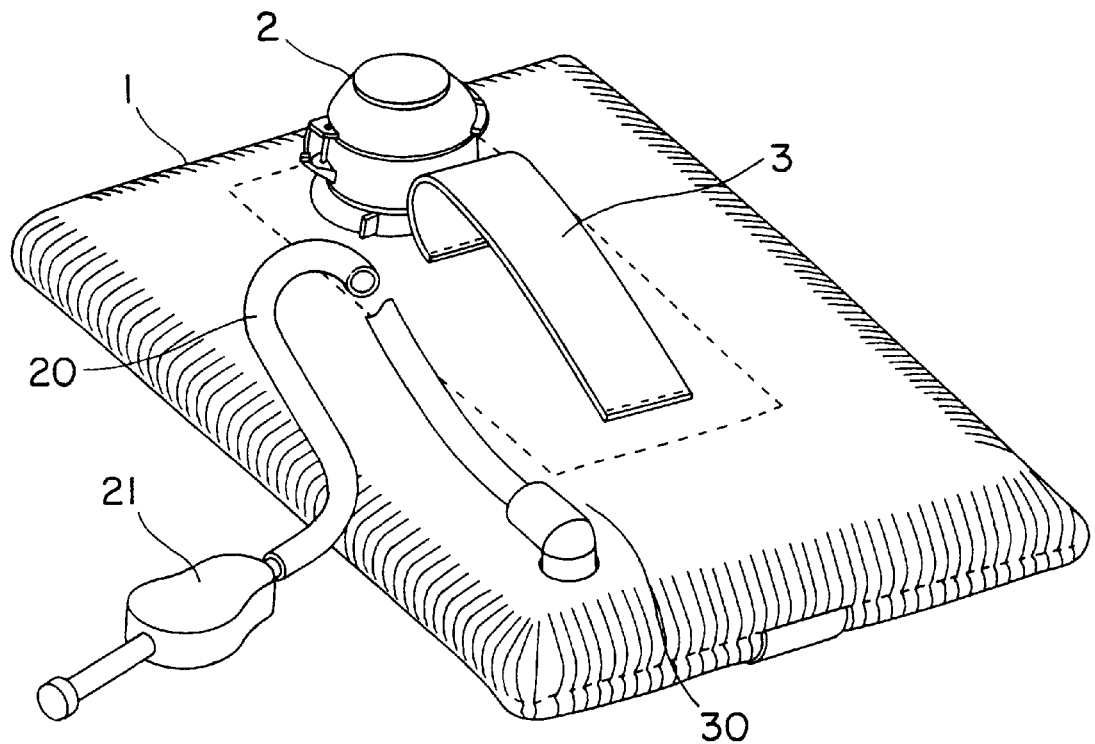
FIGS. 1a and 1b provides a general view of a typical embodiment of the present invention, equipped with dispensing means and a flow valve, viewed from opposite sides.
Figure 1B:
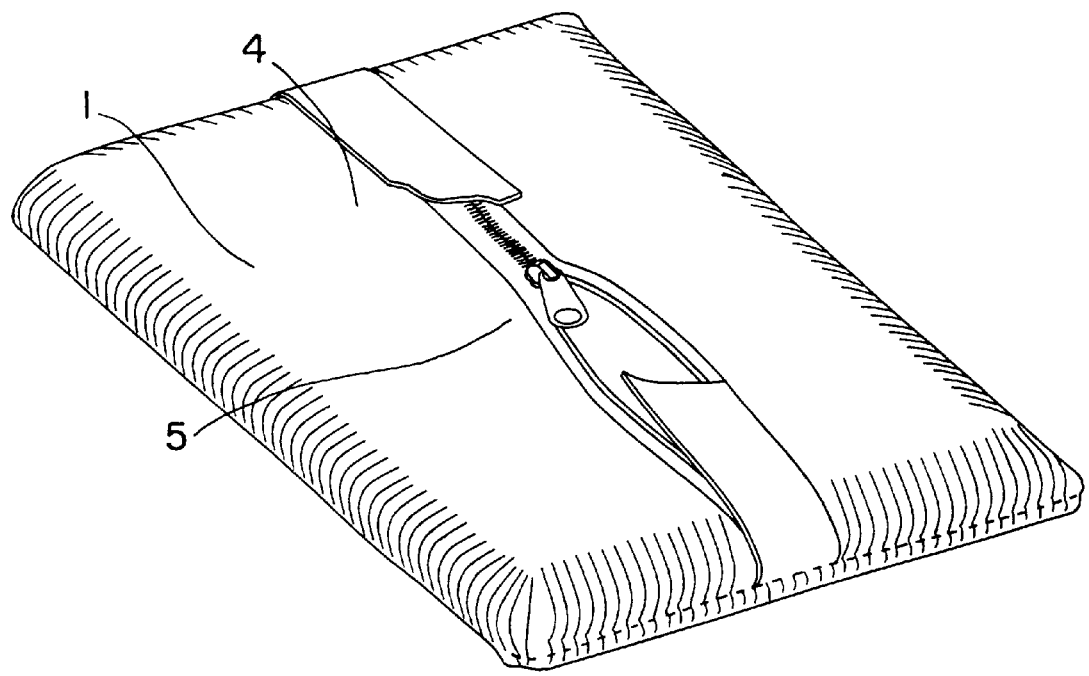

FIG. 1 provides a general view of a typical embodiment of the present invention, equipped with dispensing means and a flow valve, viewed from opposite sides (a and b). It comprises an outer bag (1), an inner collapsible impervious bag (not visible in this Figure), a versatile cap for liquid dispensing (2), a handle (3) for convenient hold while filling up the inner bag and an opening (5) for replacing the inner bag if damaged, covered by a fabric strip (4) for extra safety and convenience in carrying. Optionally it is equipped with a flexible drinking tube (20) and a flow valve (21). The flexible drinking tube is connected to the inner bag using a right angled pipe joint (30) welded to the inner bag.

Figure 2A:
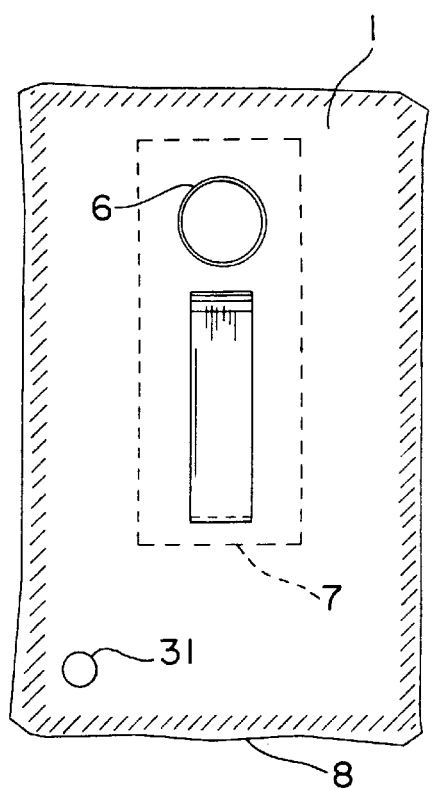
FIGS. 2a and 2b provides the inner beg and the outer bag of a typical embodiment of the present invention laid adjacent prior to the insertion of the inner bag inside the outer bag.
Figure 2B:
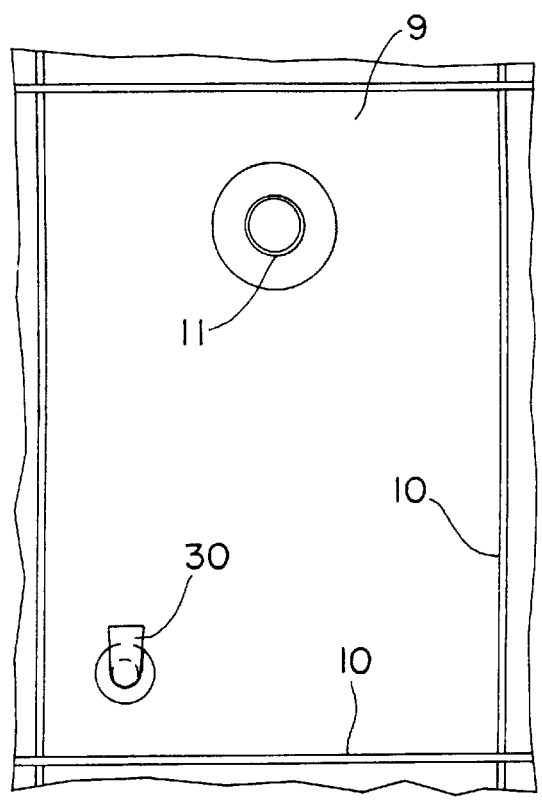

FIG. 2 (a and b) illustrates the inner bag (9) and the outer bag (1) of a typical embodiment of the present invention laid adjacent prior to the insertion of the inner bag inside the outer bag. The inner bag is made of a plastic material, which does not impart undesirable taste to the liquid contained therein. A most preferred inner bag is made of two polyethylene sheets, its inner volume being defined by welded seam lines (10). The outer bag is made of a non-stretching flexible sheet, such as nylon fabric, stitched at the seams (8) using a relatively strong thread, like a nylon thread. It should be pointed out that the inner bag's longitudinal dimensions (i.e. its length and width) defined by welded seam lines (10) are larger than the outer bag's longitudinal dimensions defined by the perimeter (8) when flat empty. The inner bag has a circular liquid dispensing opening (11) equipped with a prolonged rigid neck, provided with an external screw thread, and optionally with a right angled pipe joint (30). When the inner bag is placed inside the outer bag, the prolonged neck of the liquid dispensing opening is threaded through the circular hole (6) and the cap (not showing in this Figure) is then screwed onto said neck. Similarly the right angled pipe joint is threaded through the circular hole (31). A rigid or semi-rigid plate, made of materials such as cardboard or plastic, its edges smoothed to prevent cutting or tearing of the inner bag, is placed and secured to the inner surface of the outer bag, at the location of the cap opening and the handle, and is stitched in place along a stitch line (7) surrounding the cap opening and the handle. This plate provides a relative rigidity at the location of the cap and handle for extra convenience for carrying and filling up the flexible container with liquid.

Figure 3:
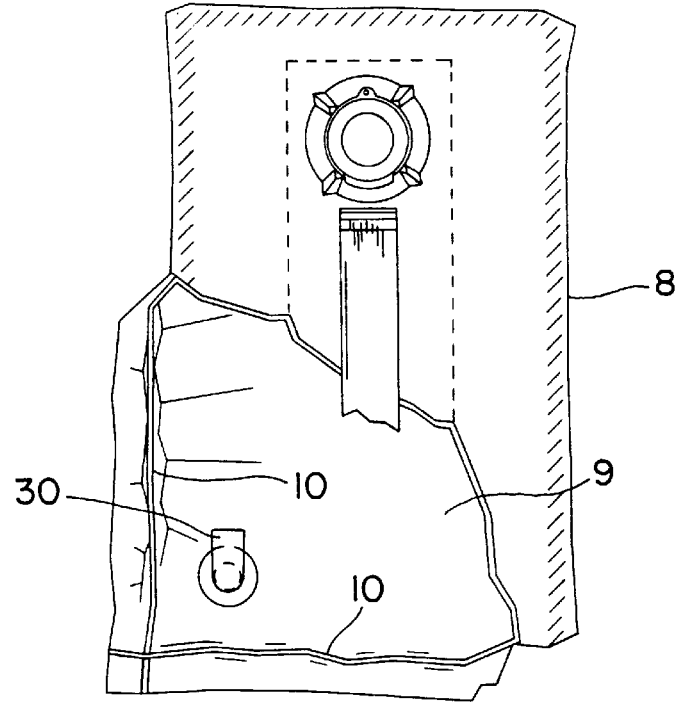
FIG. 3 provides a view of a typical embodiment of the present invention, where an imaginary opening in the outer bag is present illustrating the layout of the inner bag located inside.

FIG. 3 provides a view of a typical embodiment of the present invention, where an imaginary opening in the outer bag is present illustrating the layout of the inner bag located inside.

Figure 4:
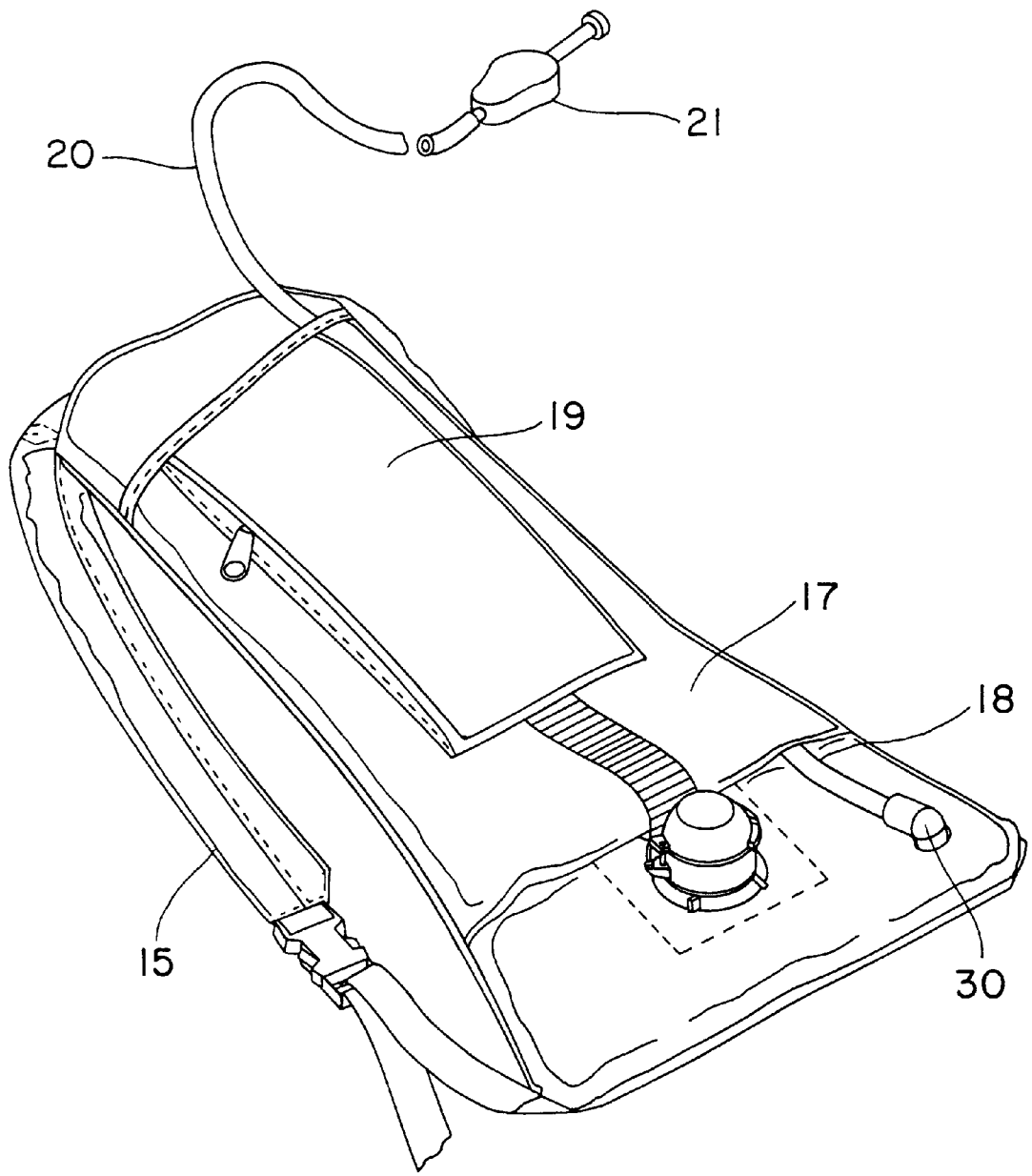
FIG. 4 shows another typical embodiment of the present invention, suitable for carrying on the back.

FIG. 4 shows another typical embodiment of the present invention, suitable for carrying the container on the back. It is equipped with two adjustable straps (15) (one strap is hidden in the drawing). Its drinking tube (20), connected to the right angled pipe joint (30), is passed beneath an outer fabric layer (17), through an opening (18) provided, in order to store the tube when not in use, and to protect said tube from external damage. A pleated pocket (19) is also provided, attached to the outer surface of the outer bag, for storing and carrying accessories like tubes, inner bag replacements or other items of necessity (like a cellular phone many people engaged in outdoor activity prefer to take with them). The drinking tube is optionally equipped with a flow valve (21).

Figure 5:
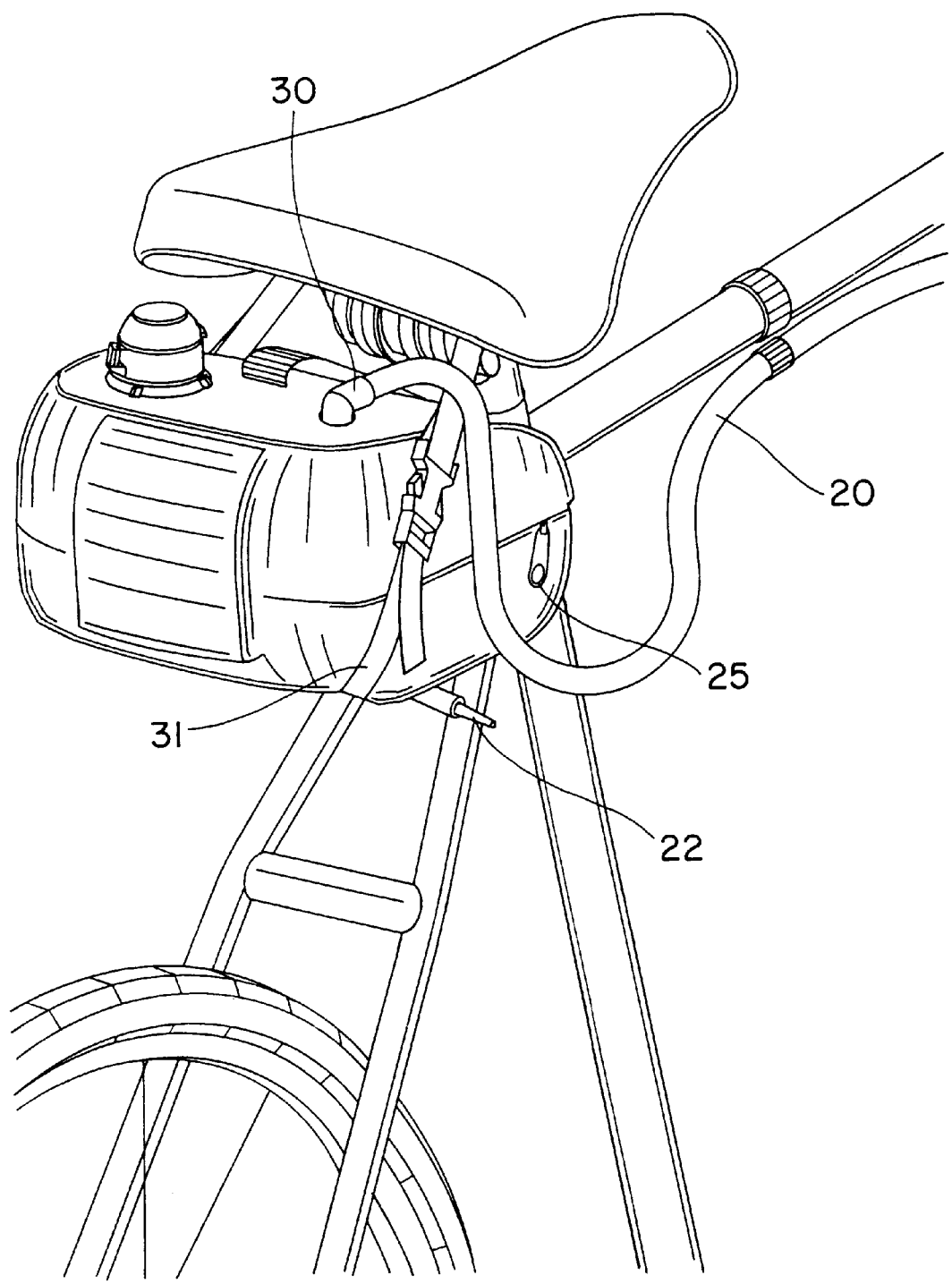
FIG. 5 illustrates another typical embodiment of the present invention, suitable for use by a cyclist, provided with an additional inflatable inner air bag, for applying pressure on the liquid containing inner bag, thus enabling easier liquid dispensing.

FIG. 5 illustrates another typical embodiment of the present invention, equipped with an inflatable inner air bag, for applying pressure on the inner bag containing liquid. The inflated inner air bag applies pressure on the liquid containing inner bag, and forces the liquid out through the dispensing means. The flexible container can be therefore placed below the user, for instance, hooked to his belt, or attached to a bicycle seat. A tube is extended up to the height of the user mouth, who can drink from it with relatively little effort.

Figure 6:
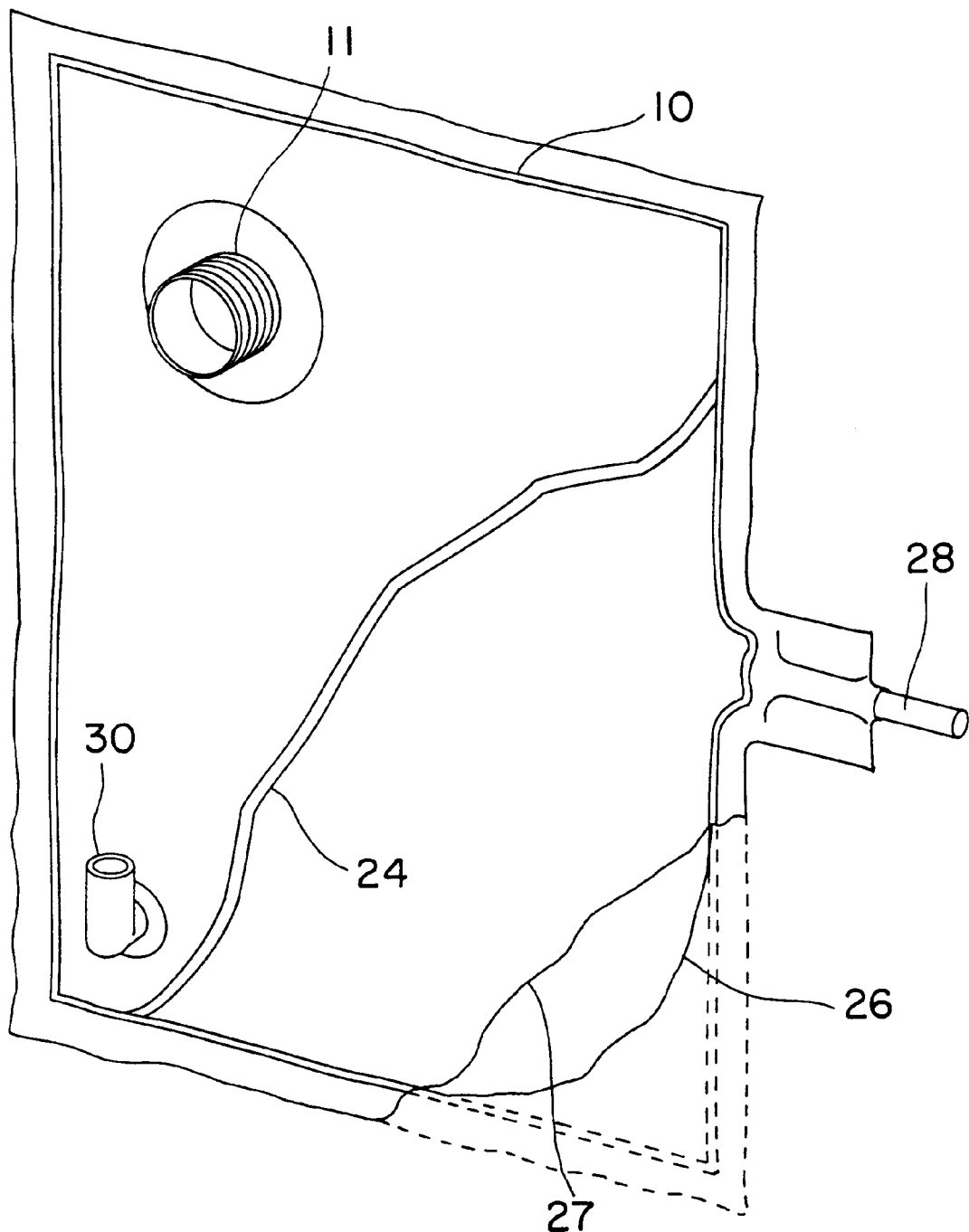
FIG. 6 illustrates a preferred inner layout of the liquid and air bags inside said embodiment.

This embodiment is designed to make drinking from the liquid container easier for the user. It is known that athletes, bicyclists, and other people engaged in strenuous physical activity, develop rapid breathing and their heartbeat rate accelerates. This makes it harder for them to drink up the contents of a liquid bag through a drinking tube, as the action of sucking is contrary to their breathing rapidly. The modified version of the flexible liquid bag disclosed herein introduces an inflatable impervious air bag placed inside the outer bag, adjacent the inner liquid bag. The user fills up the liquid inner bag, and then inflates the air bag, through its pumping valve (22), using a bicycle pump or an airpump at a gas station,. When fully inflated the air bag exerts pressure on the inner bag, forcing the stored liquid to flow out through the right angled pipe joint (30) and the drinking tube (20). This embodiment necessitates the use of a flow valve, a cock or the like, with the tube, in order to prevent undesired spilling of the liquid through the tube. Excessive pressure buildup inside the air bag, above a predetermined pressure value—a 2 Bars high pressure limit is recommended—is discharged through a safety pressure relief valve (optionally the pumping valve (22) is designed to act also as a relief valve), thus preventing damage to the system or to the user. Zipped opening (25) enables replacement of the inner bags when necessary. FIG. 6 illustrates a preferred inner layout of the liquid bag and air bag inside the embodiment illustrated in FIG. 6. The liquid bag volume is defined by the sheets assigned with the numerals 24 and 27 and their adjoining welded seams. The sheet assigned the numeral 27 serves also as the back of the air bag, whose volume is defined by sheets 27 and 26. Liquid is charged and discharged in the liquid bag through the opening (11) and or through the right angled pipe joint (30) to which a tube is to be fitted, whereas the air can be pumped into the air bag through the tubule (28).

DETAILED DESCRIPTION OF THE INVENTION

In a typical embodiment of the flexible liquid container of the present invention the inner collapsible impervious bag for dispensing liquid is made of polyethylene, that was found to be a material which when used for food storing does not impart a bad taste. This material was approved for use by the FDA (FDA Food Grade). However polyethylene sheets are easily torn and cannot withstand high pressure build up within.

The outer bag, on the other hand, is made of a non-stretching flexible material, such as nylon fabric.

When pressure, resulting from an external impact or from an internal pressurized liquid, begins to build up, the inner bag inflates. If it were not for the outer bag, the inner bag would reach a point where it would be fully inflated and its walls would then expand up to the point where they would burst. It was found that typical polyethylene bags used for liquid storage, of average thickness (50–250 microns), burst at pressures in the order of 0.3–0.4 Bars.

However this is not made possible as the outer bag prevents the inner bag walls from expanding. As the outer bag's longitudinal dimensions are smaller from that of the inner bag, when the inner bag begins to inflate, it exerts pressure on the outer bag's walls and as a consequence the outer bag walls begin to inflate too. The outer bag is made of substantially non-stretching material, which can withstand much higher pressures than the inner bag, prior to bursting, and thus the opposite pressure produced by the outer bag walls hold the inner bag walls from expanding and bursting. The system's overall pressure resistance is determined by the outer bag's resistance property, and this can be predetermined by choosing different materials.

It was found that when the inner bag was made of polyethylene sheets, welded at the seams, and the outer bag made of a nylon fabric, having fibers of 1000 Denier in diameter, and sewn at the seams by a nylon thread such as a 204/3 (204 Denier with 3 threads) thread, the system was able to withstand pressures in the order of 4 Bars. It should be noted that generally carbonated beverages build up pressures in the order of 2 Bars.

The system of the present invention was tested in various methods. It was found that a man stepping and jumping on it exerts pressure of the order of 1.2 Bars. A vehicle (Renault Express) that was driven over the system produced pressure of the order of 1.5 Bars. A semi-trailer truck that was driven over it produced a pressure in the order of 2.5 Bars.

Figure 7:
FIG. 7 shows the use of a typical embodiment of the present invention by a cyclist.

The modified version of the flexible liquid container of the present invention (FIGS. 6 and 7) takes in account the advantage of the basic property of the present invention, namely its ability to withstand high pressure, and an air bag is introduced, which can be pumped up with air to produce an inner high pressure within the outer bag, exerting pressure on the liquid bag and forcing the liquid out through the dispensing means.

To sum up: A flexible liquid container is disclosed, comprising an inner collapsible impervious bag for dispensing liquid, located within at least one outer bag, wherein the outer bag's longitudinal dimensions are smaller than the inner bag's, and wherein the outer bag is made of a substantially non-stretching flexible material.

The flexible liquid container of the present invention can be used by bicyclists, athletes and other persons engaged in outdoor activities, even without bringing the dispensing opening to their lips in order to drink. This is made possible by using a flexible drinking tube, optionally equipped with a flow valve. This feature is very important for outdoor activities as it enables the user to bend down or lie down without the risk of spillage.

It should be clear that the description of the embodiments and attached Figures set forth in this specification serves only for a better understanding of the invention, without limiting its scope as covered by the following claims. It should also be clear that a person in the art, after reading the present specification could make adjustments or amendments to the attached figures and above described embodiments that would still be covered by the following claims.

What is claimed is:

1. A flexible container for storing and dispensing liquids, comprising an inner bag and at least one outer bag, and liquid dispensing means, wherein said inner bag is a collapsible impervious bag for dispensing liquid, located within said outer bag, wherein the outer bag's longitudinal dimensions are smaller than the inner bag's longitudinal dimensions, such that at any given imaginary cross section, the inner bag's circumference at said imaginary cross section is greater than the outer bag's circumference at the same imaginary cross section, and wherein the outer bag is made of a substantially non-stretching flexible material.

2. A flexible liquid container of the present invention according to claim 1, wherein said inner bag is made of plastic sheets.

3. A flexible liquid container of the present invention according to claim 2, wherein said plastic sheets are made of polyethylene.

4. A flexible liquid container of the present invention according to claim 3, wherein said polyethylene sheets are welded at the seams.

5. A flexible liquid container of the present invention according to claim 1, wherein said inner bag is provided with at least one liquid dispensing opening.

6. A flexible liquid container of the present invention according to claim 5, wherein said dispensing opening is equipped with a prolonged rigid neck, provided with an external screw thread.

7. A flexible liquid container of the present invention according to claim 5, wherein said inner bag is provided with two liquid dispensing openings.

8. A flexible liquid container of the present invention according to claim 1, wherein said outer bag is made of fabric.

9. A flexible liquid container of the present invention according to claim 8, wherein said fabric is made of nylon.

10. A flexible liquid container of the present invention according to claim 8 or 9, wherein said fabric is stitched at the seams.

11. A flexible liquid container of the present invention according to claim 5, wherein a cap covers said liquid dispensing opening.

12. A flexible liquid container according to claim 1, wherein an inflatable impervious bag is placed inside the outer bag, adjacent the inner liquid bag.

13. A flexible liquid container according to claim 12, wherein said inflatable bag is provided with a pumping valve.

14. A flexible liquid container according to claim 12, wherein said inflatable bag is provided with a safety pressure relief valve.

* * * * *